(12) United States Patent
Higuchi

(10) Patent No.: US 10,928,357 B2
(45) Date of Patent: Feb. 23, 2021

(54) SENSOR CONTROL APPARATUS

(71) Applicant: NGK Spark Plug Co., LTD., Nagoya (JP)

(72) Inventor: Yuzo Higuchi, Iwakura (JP)

(73) Assignee: NGK Spark Plug Co., LTD., Nagoya (JP)

( * ) Notice: Subject to any disclaimer, the term of this patent is extended or adjusted under 35 U.S.C. 154(b) by 195 days.

(21) Appl. No.: 16/137,172

(22) Filed: Sep. 20, 2018

(65) Prior Publication Data
US 2019/0094177 A1 Mar. 28, 2019

(30) Foreign Application Priority Data
Sep. 22, 2017 (JP) .............. JP2017-182563

(51) Int. Cl.
| | |
|---|---|
| *G01N 27/417* | (2006.01) |
| *G01N 27/406* | (2006.01) |
| *G01N 27/409* | (2006.01) |
| *G01N 27/41* | (2006.01) |
| *G01N 27/419* | (2006.01) |

(52) U.S. Cl.
CPC ....... *G01N 27/4175* (2013.01); *G01N 27/409* (2013.01); *G01N 27/4065* (2013.01); *G01N 27/41* (2013.01); *G01N 27/419* (2013.01)

(58) Field of Classification Search
CPC ........... G01N 27/4175; G01N 27/4065; G01N 27/409; G01N 27/41; G01N 27/419
USPC ......... 73/23.21, 1.06, 23.32, 114.72, 114.73; 204/424–429, 431, 432
See application file for complete search history.

(56) References Cited

FOREIGN PATENT DOCUMENTS

JP 2014-48279 A 3/2014

*Primary Examiner* — Robert R Raevis
(74) *Attorney, Agent, or Firm* — Leason Ellis LLP

(57) ABSTRACT

A sensor control apparatus includes a current control section, a first condition judgment section, a second condition judgment section, a deterioration detection energization section, and a deterioration voltage detection section. The current control section controls pump current such that electromotive force cell voltage becomes equal to a control target voltage. The first condition judgment section judges whether or not a first deterioration detection condition is satisfied. The second condition judgment section judges whether or not a second deterioration detection condition is satisfied when the first deterioration detection condition is satisfied. The deterioration detection energization section supplies deterioration detection current to the oxygen concentration detection cell when the second deterioration detection condition is satisfied. The deterioration voltage detection section detects a deterioration detection voltage generated in the oxygen concentration detection cell after a deterioration detection time following the supply of the deterioration detection current has been started.

9 Claims, 9 Drawing Sheets

SENSOR CONTROL APPARATUS

This application claims the benefit of Japanese Patent Application No. 2017-182563, filed Sep. 22, 2017, which is incorporated herein by reference in its entirety.

FIELD OF THE INVENTION

The present disclosure relates to a sensor control apparatus for controlling a gas sensor.

BACKGROUND OF THE INVENTION

Conventionally, there has been known a sensor control apparatus for controlling a gas sensor which includes an oxygen concentration detection cell including a solid electrolyte body having a pair of first electrodes, and a pump cell including a solid electrolyte body having a pair of second electrodes. Such a sensor control apparatus controls the pump current flowing between the pair of second electrodes of the pump cell such that the voltage produced between the pair of first electrodes of the oxygen concentration detection cell becomes equal to a control target voltage.

Japanese Unexamined Publication No. 2014-48279 describes a sensor control apparatus which detects deterioration of the oxygen concentration detection cell by using a difference between a first element resistance in a state in which the pump current is controlled with the control target voltage being set to a first target voltage and a second element resistance in a state in which the pump current is controlled with the control target voltage being set to a second target voltage.

Problem to be Solved by the Invention

However, the sensor control apparatus described in Japanese Unexamined Publication No. 2014-48279 has a problem in that deterioration detection requires time, because the concentration of oxygen within a measurement chamber must be changed, by switching the control target voltage, so as to detect deterioration of the oxygen concentration detection cell.

An object of the present disclosure is to detect deterioration of a gas sensor within a short period of time.

SUMMARY OF THE INVENTION

Means for Solving the Problem

One mode of the present disclosure is a sensor control apparatus for controlling a gas sensor. The gas sensor includes a measurement chamber into which gas under measurement (target gas) is introduced, an oxygen concentration detection cell, and a pump cell. The oxygen concentration detection cell has a first solid electrolyte body and paired first electrodes which are formed on the first solid electrolyte body, one of which is disposed to face the measurement chamber, and the other of which is disposed in a reference oxygen chamber set to a reference oxygen partial pressure atmosphere. The oxygen concentration detection cell generates an electromotive force cell voltage corresponding to an oxygen partial pressure difference between the measurement chamber and the reference oxygen chamber. The pump cell has a second solid electrolyte body and paired second electrodes which are formed on the second solid electrolyte body and one of which is disposed to face the measurement chamber. The pump cell pumps out oxygen contained in the target gas introduced into the measurement chamber or pumps oxygen into the measurement chamber in accordance with pump current flowing between the paired second electrodes.

The sensor control apparatus of the present disclosure includes a current control section, a first condition judgment section, a second condition judgment section, a deterioration detection energization section, and a deterioration voltage detection section.

The current control section is configured to control the pump current such that the electromotive force cell voltage becomes equal to a previously set control target voltage.

The first condition judgment section is configured to judge whether or not a first deterioration is satisfied, said first detection condition being previously set and indicating that the current control section is controlling the pump current. The second condition judgment section is configured to judge, when the first condition judgment section judges that the first deterioration detection condition is satisfied, whether or not a previously set second deterioration detection condition is satisfied when the first condition judgment section judges that the first deterioration detection condition is satisfied.

The deterioration detection energization section is configured to supply deterioration detection current having a predetermined constant current value to the oxygen concentration detection cell when the second condition judgment section judges that the second deterioration detection condition is satisfied.

The deterioration voltage detection section is configured to detect deterioration detection voltage after a predetermined deterioration detection time following the supply of the deterioration detection current by the deterioration detection energization section to the oxygen concentration detection cell, the deterioration detection voltage being generated in the oxygen concentration detection cell as a result of the deterioration detection current flowing to the oxygen concentration detection cell.

The control target voltage is set to a stoichi-time voltage which is the electromotive force cell voltage in the case where the oxygen concentration of the target gas is equal to the oxygen concentration of gas discharged from an internal combustion engine as a result of combustion in the internal combustion engine of an air-fuel mixture having a stoichiometric air-fuel ratio.

The first deterioration detection condition is that the electromotive force cell voltage falls within a first voltage range set to include the stoichi-time voltage. The second deterioration detection condition is that the electromotive force cell voltage falls within a second voltage range that is set to include the stoichi-time voltage, is narrower than the first voltage range, and is included within the first voltage range.

The sensor control apparatus of the present disclosure configured as described above detects the deterioration detection voltage at the point in time after the deterioration detection time following the supply of the deterioration detection current to the oxygen concentration detection cell. Therefore, the sensor control apparatus of the present disclosure can obtain information necessary for judging whether or not the gas sensor has deteriorated (namely, the deterioration detection voltage) within a short period of time. Thus, the sensor control apparatus can detect deterioration of the gas sensor within a short period of time.

Further, after the first deterioration detection condition is satisfied, the sensor control apparatus of the present disclosure judges whether or not the second deterioration detection condition is satisfied. Therefore, the sensor control apparatus of the present disclosure can judge whether or not the gas sensor has deteriorated while the current control section is controlling the pump current.

Also, in the one mode of the present disclosure, the sensor control apparatus may comprise a deterioration judgment section configured to judge whether or not the gas sensor has deteriorated based on a deterioration determination voltage set through use of the deterioration detection voltage. In this case, the sensor control apparatus of the present disclosure can accurately detect deterioration of the gas sensor.

Also, in the one mode of the present disclosure, the sensor control apparatus may comprise a preliminary deterioration voltage detection section, and the deterioration determination voltage may be a voltage obtained by subtracting the preliminary deterioration detection voltage from the deterioration detection voltage. The preliminary deterioration voltage detection section is configured to detect a preliminary deterioration detection voltage after a preliminary deterioration detection time following the supply of the deterioration detection current by the deterioration detection energization section to the oxygen concentration detection cell, the preliminary deterioration detection voltage being previously set to be shorter than the deterioration detection time and being generated in the oxygen concentration detection cell as a result of the deterioration detection current flowing to the oxygen concentration detection cell. The preliminary deterioration detection time is previously set to be shorter than the deterioration detection time.

In this case, the sensor control apparatus of the present disclosure can employ, as the deterioration determination voltage, the difference between the deterioration detection voltage and the preliminary deterioration detection voltage which receive the influence of disturbance factors and fluctuate; i.e., voltage from which the disturbance factors have been removed. Therefore, the deterioration detection accuracy can be improved. Notably, examples of the above-mentioned disturbance factors include variation of the oxygen concentration of the target gas introduced into the measurement chamber, variation of the temperature of the target gas, etc.

Also, in the one mode of the present disclosure, the deterioration determination voltage may be the deterioration detection voltage. In this case, the sensor control apparatus of the present disclosure can employ, as the deterioration determination voltage, the deterioration detection voltage detected by the deterioration voltage detection section as is. Therefore, the processing load for deterioration detection can be reduced.

Also, in the one mode of the present disclosure, the deterioration determination voltage may be obtained by subtracting a new-sensor deterioration detection voltage from the deterioration detection voltage, said new-sensor deterioration detection voltage being previously set as the deterioration detection voltage when the gas sensor is new. In this case, the sensor control apparatus of the present disclosure can employ, as the deterioration determination voltage, an increase in the deterioration detection voltage due to deterioration, whereby the deterioration detection accuracy can be improved, and the degree of deterioration can be judged.

Also, in the one mode of the present disclosure, the sensor control apparatus may comprise a notification section configured to notify a deterioration of the gas sensor has when the deterioration judgment section judges that the gas sensor has deteriorated. In this case, when the gas sensor has deteriorated, the sensor control apparatus of the present disclosure can prompt a user of the gas sensor to take appropriate measures such as replacement of the gas sensor.

Also, in the one mode of the present disclosure, the sensor control apparatus may comprise a pump current correction section configured to correct the current value of the pump current on the basis of the deterioration determination voltage set through use of the deterioration detection voltage. In this case, the sensor control apparatus of the present disclosure can prevent a decrease in oxygen concentration detection accuracy even when the gas sensor has deteriorated.

Also, in the one mode of the present disclosure, the sensor control apparatus may comprise an impedance detection energization section, an impedance voltage detection section, a heater control section, and a control correction section.

The impedance detection energization section is configured to supply impedance detection current having a predetermined constant current value to the oxygen concentration detection cell. The impedance voltage detection section is configured to detect an impedance detection voltage after a predetermined impedance detection time following the supply of the impedance detection current by the impedance detection energization section to the oxygen concentration detection cell, the impedance detection voltage being generated in the oxygen concentration detection cell as a result of the impedance detection current flowing to the oxygen concentration detection cell.

The heater control section is configured to control energization of a heater for heating the oxygen concentration detection cell and the pump cell through use of the impedance detection voltage detected by the impedance voltage detection section. The control correction section is configured to correct the control performed by the heater control section on the basis of the deterioration determination voltage set from the deterioration detection voltage.

In this case, the sensor control apparatus of the present disclosure can prevent a decrease in the accuracy of the temperature control of the gas sensor by the heater even when the impedance detection voltage changes due to the deterioration of the gas sensor.

Also, in the one mode of the present disclosure, the control correction section may correct the control performed by the heater control section by correcting, on the basis of the deterioration determination voltage, a target value of a controlled variable for controlling the heater.

BRIEF DESCRIPTION OF THE DRAWINGS

These and other features and advantages of the present invention will become more readily appreciated when considered in connection with the following detailed description and appended drawings, wherein like designations denote like elements in the various views, and wherein.

DETAILED DESCRIPTION OF THE INVENTION

First Embodiment

A first embodiment of the present disclosure will now be described with reference to the drawings.

Figure 1:
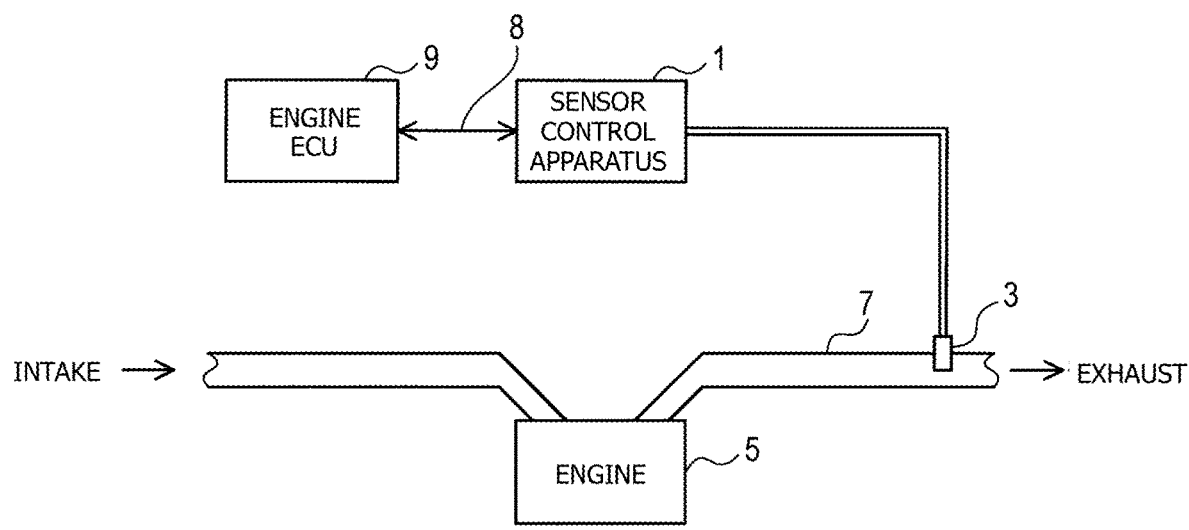
FIG. 1 is a diagram showing a schematic configuration of a system which includes a sensor control apparatus as a constituent element.

A sensor control apparatus 1 of the present embodiment is mounted on a vehicle, and, as shown in FIG. 1, controls a gas sensor 3.

The sensor control apparatus 1 is configured such that, via a communication line 8, data can be transmitted to and received from an electronic control apparatus 9 for controlling an engine 5. Hereinafter, the electronic control apparatus 9 will be referred to as the "engine ECU 9." ECU is an abbreviation of Electronic Control Unit.

The gas sensor 3 is attached to an exhaust pipe 7 of the engine 5 and detects the concentration of oxygen in exhaust gas in a wide range. The gas sensor 3 is also called "linear lambda sensor."

Figure 2:
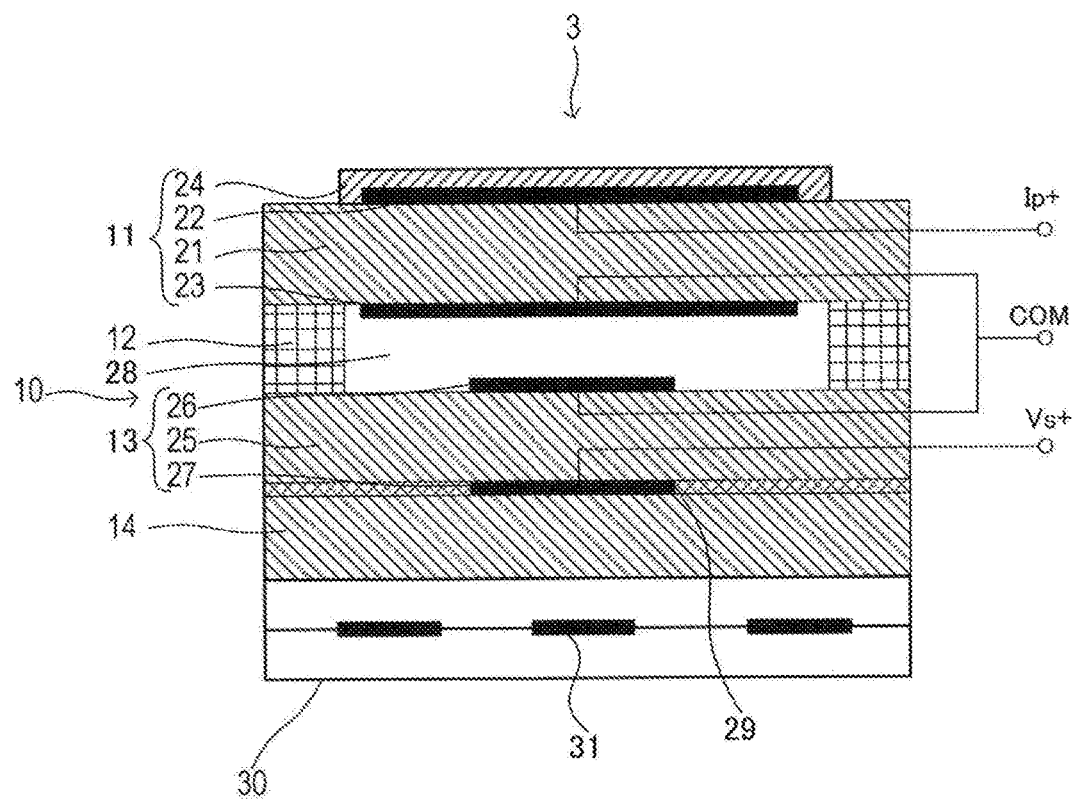
FIG. 2 is a view showing a schematic structure of a gas sensor.

As shown in FIG. 2, the gas sensor 3 has a sensor element 10, a heater 30, a terminal Ip+, a terminal COM, and a terminal Vs+.

The sensor element 10 includes a pump cell 11, porous diffusion layers 12, an oxygen concentration detection cell 13, and a reinforcing plate 14.

The pump cell 11 includes an oxygen-ion-conductive solid electrolyte body 21 formed of partially stabilized zirconia and having a plate-like shape, pump electrodes 22 and 23 provided on the front and back surfaces of the oxygen-ion-conductive solid electrolyte body 21 and formed mainly of platinum, and a porous protective layer 24 covering the pump electrode 22. The porous protective layer 24 covering the pump electrode 22 protects the pump electrode 22 from poisoning substances or the like. The pump electrode 22 is connected to the terminal Ip+, and the pump electrode 23 is connected to the terminal COM.

The oxygen concentration detection cell 13 includes an oxygen-ion-conductive solid electrolyte body 25 formed of partially stabilized zirconia and having a plate-like shape, and detection electrodes 26 and 27 provided on the front and back surfaces of the oxygen-ion-conductive solid electrolyte body 25 and formed mainly of platinum. The detection electrode 26 is connected to the terminal COM, and the detection electrode 27 is connected to the terminal Vs+.

An unillustrated insulating layer formed mainly of an insulating material (e.g., alumina) is provided between the pump cell 11 and the oxygen concentration detection cell 13 so as to electrically insulate the pump cell 11 and the oxygen concentration detection cell 13 from each other. The porous diffusion layers 12 are provided in portions of the insulating layer. Notably, the porous diffusion layers 12 are formed mainly of an insulating material (e.g., alumina) to be porous for limiting the diffusion rate of a gas under measurement introduced into the sensor element 10.

A hollow measurement chamber 28 surrounded by the porous diffusion layers 12 and the unillustrated insulating layer is formed between the pump cell 11 and the oxygen concentration detection cell 13. Namely, the measurement chamber 28 communicates with a measurement gas atmosphere through the porous diffusion layers 12. The pump electrode 23 and the detection electrode 26 are disposed in the measurement chamber 28.

The reinforcing plate 14 is disposed on a surface of the oxygen concentration detection cell 13 on the side opposite a surface thereof facing the measurement chamber 28 such that the reinforcing plate 14 is in close contact with the former surface while sandwiching the detection electrode 27. As a result, the reinforcing plate 14 increases the overall strength of the sensor element 10. Notably, the reinforcing plate 14 has a size approximately the same as those of the solid electrolyte bodies 21 and 25 of the pump cell 11 and the oxygen concentration detection cell 13. The reinforcing plate 14 is made of a material containing ceramic as a main component and is formed into a plate-like shape.

In the sensor element 10 configured as described above, a constant small current Icp is caused to flow from the detection electrode 27 of the oxygen concentration detection cell 13 toward the detection electrode 26 so as to pump oxygen from the measurement chamber 28 toward the detection electrode 27. As a result, oxygen of an approximately constant concentration is accumulated in the reference oxygen chamber 29 formed around the detection electrode 27. The oxygen of an approximately constant concentration accumulated in the reference oxygen chamber 29 serves as a reference oxygen concentration when the oxygen concentration in the gas under measurement is detected by the sensor element 10. Therefore, the detection electrode 27 is also called a self-generating reference electrode.

The heater 30 is formed to have a flat-plate-like shape, is stacked on the reinforcing plate 14, and is integrated with the pump cell 11, the oxygen concentration detection cell 13, and the reinforcing plate 14. The heater 30 is formed of a material whose main component is alumina, and includes a heater wire 31 formed of a material whose main component is platinum. The heater 30 is controlled by electric power supplied from a heater control circuit 42, which will be described later, such that the temperature of the sensor element 10 becomes an activation temperature (e.g., 550 to 900° C.).

Notably, when the sensor element 10 becomes active as a result of heating by the heater 30, the gas sensor 3 enters a gas detectable state.

In the sensor element 10, oxygen contained in the gas under measurement diffuses into the measurement chamber 28 through the porous diffusion layers 12. The sensor element 10 has characteristics as follows. When exhaust gas discharged from the engine 5 as a result of combustion in the engine 5 of an air-fuel mixture having a stoichiometric air-fuel ratio is introduced into the measurement chamber 28, an electromotive force of 450 mV is produced in the oxygen concentration detection cell 13 due to the difference in oxygen concentration between the measurement chamber 28 and the reference oxygen chamber 29.

Notably, the oxygen concentration detection cell 13 has characteristics that it generates voltage corresponding to the difference in oxygen concentration between the detection electrode 26 and the detection electrode 27. The oxygen within the reference oxygen chamber 29 which the detection electrode 27 faces has an approximately constant concentration. Therefore, the oxygen concentration detection cell 13 generates, between the detection electrode 26 and the detection electrode 27, a voltage (electromotive force) corresponding to the oxygen concentration within the measurement chamber 28.

Incidentally, when the air-fuel ratio of the air-fuel mixture supplied to the internal combustion engine changes, the concentration of oxygen contained in exhaust gas changes, whereby the concentration of oxygen contained in the measurement chamber 28 of the sensor element 10 changes. In view of this, the sensor control apparatus 1 controls the pump current Ip flowing to the pump cell 11 such that the potential difference between the detection electrode 26 and the detection electrode 27 is maintained at 450 mV. Namely, as a result of control of the pump current Ip such that the atmosphere within the measurement chamber 28 becomes the same as that in the case where the air-fuel ratio is the stoichiometric air-fuel ratio, pumping of oxygen is performed by the pump cell 11. Therefore, the sensor control apparatus 1 can compute the oxygen concentration in the exhaust gas on the basis of the flow state of the pump current Ip (for example, flow direction, current cumulative value, etc.). Hereinafter, a "state in which the oxygen concentration within the measurement chamber 28 is equal to the oxygen concentration of exhaust gas discharged from the engine 5 as a result of combustion in the engine 5 of an air-fuel mixture having a stoichiometric air-fuel ratio" will be referred to as a stoichi state. Notably, "stoichi" is short for "stoichiometric." The voltage (namely, 450 mV) between the detection electrode 26 and the detection electrode 27 in the above-described stoichi state will be referred to as a stoichi-time voltage.

The pump cell 11 is configured such that, in accordance with the flow direction of current flowing between the pump electrode 22 and the pump electrode 23, the pump cell 11 can selectively perform the pumping out of oxygen from the measurement chamber 28 and the pumping of oxygen into the measurement chamber 28. Also, the pump cell 11 is configured such that it can adjust the oxygen pumping rate in accordance with the magnitude of the current flowing between the pump electrode 22 and the pump electrode 23.

Figure 3:
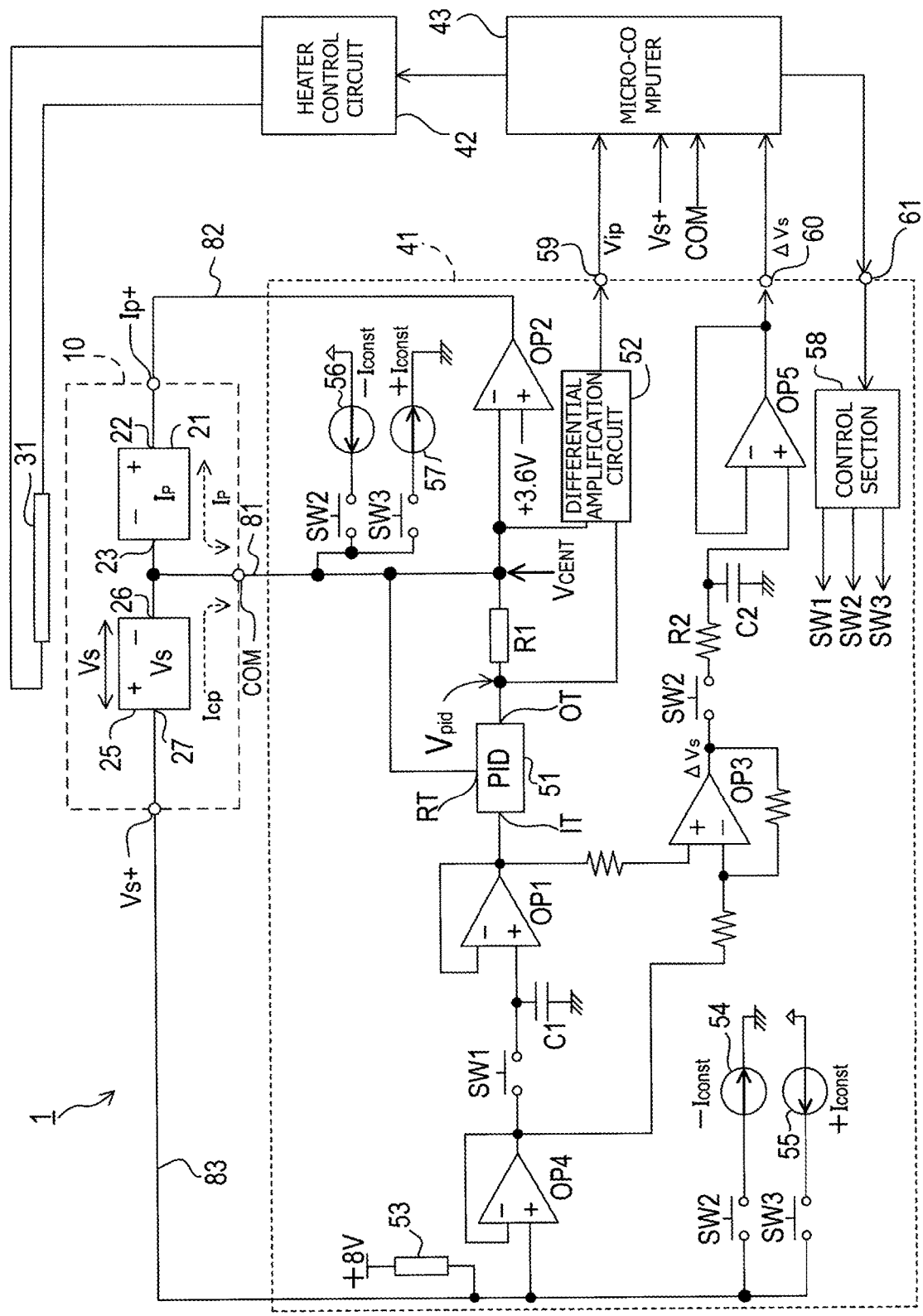
FIG. 3 is a diagram showing a schematic configuration of a sensor control apparatus.

As shown in FIG. 3, the sensor control apparatus 1 includes a sensor control circuit 41, a heater control circuit 42, and a microcomputer 43.

The sensor control circuit 41 is realized by an integrated circuit for a specific application (namely, ASIC). ASIC is an abbreviation of Application Specific IC.

Opposite ends of the heater wire 31 are connected to the heater control circuit 42. The heater control circuit 42 PWM-controls the voltage supplied to the opposite ends of the heater wire 31 on the basis of a PWM control signal input from the microcomputer 43, thereby causing the heater 30 to generate heat. PWM is an abbreviation of Pulse Width Modulation.

The microcomputer 43 includes a CPU, a ROM, a RAM, etc. The various functions of the microcomputer are realized by a program which is stored in a non-transitory tangible recording medium and executed by the CPU. In this example, the ROM corresponds to the non-transitory tangible recording medium storing the program. Also, a method corresponding to the program is performed as a result of execution of this program. Notably, some or all of the functions of the CPU may be realized by hardware; for example, by a single IC or a plurality of ICs.

The sensor control circuit 41 includes resistors R1 and R2, operational amplifiers OP1, OP2, OP3, OP4, and OP5, a switch SW1, three switches SW2, two switches SW3, and capacitors C1 and C2. The sensor control circuit 41 further includes a PID control circuit 51, a differential amplification circuit 52, an Icp supply circuit 53, current sources 54, 55, 56, and 57, a control section 58, output terminals 59 and 60, and a reception port 61.

The terminal COM of the gas sensor 3 is connected to a Vcent point through a connection wire 81. The terminal Ip+ of the gas sensor 3 is connected to the output terminal of the operational amplifier OP2 through a connection wire 82. The terminal Vs+ of the gas sensor 3 is connected to the noninverting input terminal of the operational amplifier OP4 through a connection wire 83. Notably, the voltage of the terminal COM and the voltage of the terminal Vs+ are respectively input to the microcomputer 43 via an unillustrated circuit.

Also, the terminal Vs+ is connected to the Icp supply circuit 53. The Icp supply circuit 53 is a constant current source circuit for supplying the above-described small current Icp. The Icp supply circuit 53, the connection wire 83, the oxygen concentration detection cell 13, and the connection wire 81 are connected in this order and form a current path through which the small current Icp flows.

The inverting input terminal of the operational amplifier OP2 is connected to the Vcent point. A reference voltage of 3.6 V is applied to the noninverting input terminal of the operational amplifier OP2. The output terminal of the operational amplifier OP2 is connected to the terminal Ip+ of the gas sensor 3 through the connection wire 82 as described above.

The noninverting input terminal of the operational amplifier OP4 is connected to the terminal Vs+ of the gas sensor 3 through the connection wire 83 as described above. The output terminal of the operational amplifier OP4 is connected to the inverting input terminal of the operational amplifier OP4 and is connected to the noninverting input terminal of the operational amplifier OP1 through the switch SW1. One end of the capacitor C1 is connected to a connection point between the switch SW1 and the operational amplifier OP1, and the other end of the capacitor C1 is grounded.

The output terminal of the operational amplifier OP1 is connected to the inverting input terminal of the operational amplifier OP1 and is connected to the input terminal IT of the PID control circuit 51. The operational amplifier OP1 forms a sample hold circuit together with the capacitor C1 and the switch SW1.

The PID control circuit 51 has a reference terminal RT and an output terminal OT in addition to the above-mentioned input terminal IT. The reference terminal RT is connected to the Vcent point. The output terminal OT is connected to the Vcent point through the resistor R1.

The PID control circuit 51 controls, by means of PID control, the magnitude of the pump current Ip such that the voltage difference between the voltage of the terminal Vs+ applied to the input terminal IT through the operational amplifier OP4 and the operational amplifier OP1 and the voltage at the Vcent point applied to the reference terminal RT becomes equal to a control target voltage (450 mV in the present embodiment). Specially, the deviation, from the target control voltage, of the voltage Vs generated between the opposite ends of the oxygen concentration detection cell 13 is PID-computed by the PID control circuit 51 and is fed back to the operational amplifier OP2, so that the operational amplifier OP2 supplies the pump current Ip to the pump cell 11. Notably, the control target voltage is equal to the above-mentioned stoichi-time voltage.

The differential amplification circuit 52 differentially amplifies the voltage across the resistor R1 which converts the magnitude of the pump current Ip to a voltage signal (namely, the difference between the potential Vcent and the potential Vpid of the output terminal OT of the PID control circuit 51) and outputs the amplified voltage as a gas detection signal Vip. The output terminal of the differential amplification circuit 52 is connected to the output terminal 59 of the sensor control circuit 41.

The inverting input terminal of the operational amplifier OP3 is connected to the output terminal of the operational amplifier OP4 through a resistor. The noninverting input terminal of the operational amplifier OP3 is connected to the output terminal of the operational amplifier OP1 through a resistor. The output terminal of the operational amplifier OP3 is connected to the noninverting input terminal of the operational amplifier OP5 through the switch SW2 and the resistor R2. One end of the capacitor C2 is connected to the connection point between the resistor R2 and the operational amplifier OP5, and the other end of the capacitor C2 is grounded. The output terminal of the operational amplifier OP5 is connected to the inverting input terminal of the operational amplifier OP5 and is connected to the output terminal 60 of the sensor control circuit 41. The operational amplifier OP5 forms a signal hold circuit in cooperation with the capacitor C2, the switch SW2, and the resistor R2.

The current source 54 supplies a constant current –Iconst. One end of the current source 54 is connected to the terminal Vs+ of the gas sensor 3 through the switch SW2 and the connection wire 83, and the other end of the current source 54 is grounded.

The current source 55 supplies a constant current +Iconst which is opposite in polarity to the constant current –Iconst. One end of the current source 55 is connected to a power supply, and the other end of the current source 55 is connected to the terminal Vs+ of the gas sensor 3 through the switch SW3 and the connection wire 83.

The current source 56 supplies a constant current –Iconst. One end of the current source 56 is connected to the power supply, and the other end of the current source 56 is connected to the terminal COM of the gas sensor 3 through the switch SW2 and the connection wire 81.

The current source 57 supplies a constant current +Iconst. One end of the current source 57 is connected to the terminal COM of the gas sensor 3 through the switch SW3 and the connection wire 81, and the other end of the current source 57 is grounded.

The control section 58 is a logic circuit formed in the ASIC and executes a control of turning on and off the switches SW1, SW2, and SW3. The control section 58 receives, through the reception port 61 of the sensor control circuit 41, data transmitted from the microcomputer 43.

Next, operation of the sensor control apparatus 1 for detection of the oxygen concentration will be described.

When the oxygen concentration is detected, the control section 58 turns on the switch SW1 and turns off the switches SW2 and SW3. As a result, the voltage of the terminal Vs+ of the gas sensor 3 is applied to the input terminal IT of the PID control circuit 51 through the operational amplifier OP4 and the operational amplifier OP1 each configured as a voltage follower. As described above, the PID control circuit 51 executes PID computation on the basis of the deviation of the voltage Vs from the target control voltage, and the operational amplifier OP2 supplies the pump current Ip to the pump cell 11. Further, as described above, the differential amplification circuit 52 outputs the gas detection signal Vip to the microcomputer 43. The microcomputer 43 convers the voltage value of the gas detection signal Vip to a digital value by using an unillustrated A/D conversion circuit, and then computes an oxygen concentration corresponding to the gas detection signal Vip on the basis of a map or a calculation expression provided in the microcomputer 43.

Next, operation of the sensor control apparatus 1 for detection of the impedance Rpvs of the oxygen concentration detection cell 13 will be described.

When the impedance Rpvs is detected, the control section 58 turns on the switches SW2 and turns off the switches SW1 and SW3. As a result, the voltage of the terminal Vs+ immediately before the switch SW1 is turned off is held by the capacitor C1. Therefore, the operational amplifier OP1 outputs to the PID control circuit 51 and the operational amplifier OP3 the voltage of the terminal Vs+ immediately before the switch SW1 is turned off.

Further, the current source 56, one of the switches SW2, the connection wire 81, the oxygen concentration detection cell 13, the connection wire 83, the other of the switches SW2, and the current source 54 are connected in this order, whereby a current path through which the constant current –Iconst flows is formed. As a result, the voltage of the terminal Vs+ at the time when the constant current –Iconst flows to the oxygen concentration detection cell 13 is applied to the noninverting input terminal of the operational amplifier OP4. Therefore, the operational amplifier OP4 outputs to the operational amplifier OP3 the voltage of the terminal Vs+ at the time when the constant current –Iconst flows to the oxygen concentration detection cell 13.

The operational amplifier OP3 constitutes a differential amplification circuit. Therefore, the operational amplifier OP3 outputs, as a difference voltage ΔVs, a voltage corresponding to the difference between the voltage of the terminal Vs+ input from the operational amplifier OP1 and the voltage of terminal Vs+ input from the operational amplifier OP4. Namely, the operational amplifier OP3 outputs the difference voltage ΔVs, which corresponds to the difference between the voltage of terminal Vs+ immediately before the switch SW1 is turned off and the voltage of terminal Vs+ at the time when the constant current –Iconst is flowing. Since the switches SW2 are on, the difference voltage ΔVs is applied to the noninverting input terminal of the operational amplifier OP5. As a result, the operational amplifier OP5 outputs the difference voltage ΔVs to the output terminal 60. Notably, the impedance Rpvs of the oxygen concentration detection cell 13 is computed by dividing the difference voltage ΔVs by the current value of the constant current –Iconst.

When a previously set first pulse-on time (60 μs in the present embodiment) elapses after the switches SW2 have been turned on, the control section 58 turns on the switches SW3 and turns off the switches SW1 and SW2. As a result, the difference voltage ΔVs immediately before the switches SW2 are turned off is held by the capacitor C2. Therefore, the operational amplifier OP5 outputs to the output terminal 60 the difference voltage ΔVs immediately before the switches SW2 are turned off.

Further, the current source 55, one of the switches SW3, the connection wire 83, the oxygen concentration detection cell 13, the connection wire 81, the other of the switches SW3, and the current source 57 are connected in this order, whereby a current path through which the constant current +Iconst flows is formed. As a result, the constant current +Iconst flows to the oxygen concentration detection cell 13.

By supplying the current of the opposite polarity to the oxygen concentration detection cell 13 in this manner, the time required for the voltage Vs produced in the oxygen concentration detection cell 13 to return to a normal value can be shortened.

When a previously set second pulse-on time (60 μs in the present embodiment) elapses after the switches SW3 have been turned on, the control section 58 turns off the switches SW3. Subsequently, when a stabilization waiting time which is previously set as a time required for the oxygen concentration detection cell 13 to output the voltage Vs corresponding to the oxygen concentration in the exhaust gas elapses, the control section 58 turns on the switch SW1.

As described above, the sensor control circuit 41 outputs the gas detection signal Vip corresponding to the oxygen concentration in the exhaust gas and temporarily outputs the difference voltage ΔVs corresponding to the impedance Rpvs of the oxygen concentration detection cell 13.

In the sensor control apparatus 1 configured as described above, the microcomputer 43 executes a deterioration determination process, a concentration computation process, a target correction process, and a heater control process, which will be described later.

Next, the steps of the deterioration determination process executed by the microcomputer 43 will be described. The microcomputer 43 starts the deterioration determination process immediately after the engine 5 starts.

Figure 4:
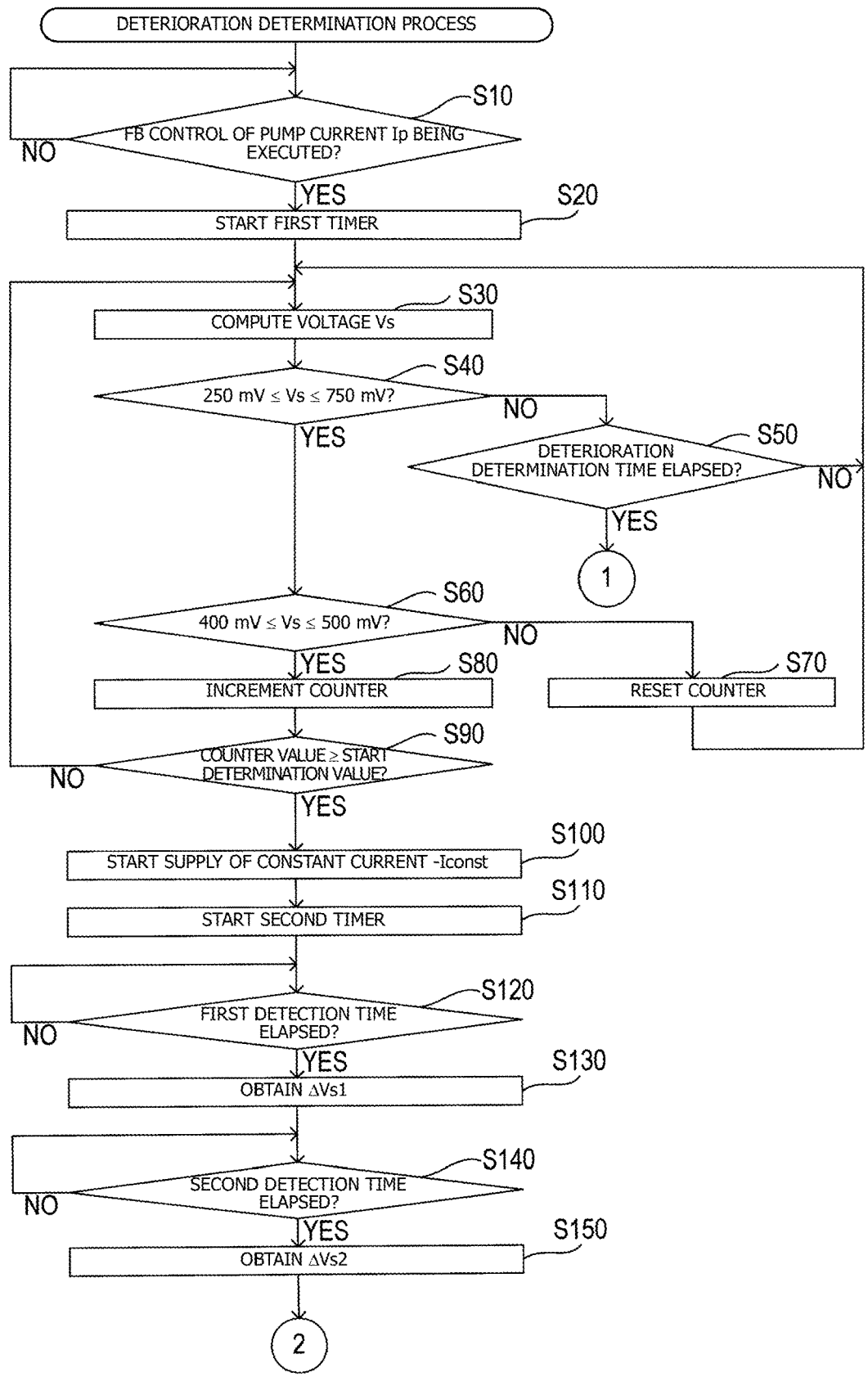
FIG. 4 is a flowchart showing a first portion of a deterioration determination process of a first embodiment.

When the deterioration determination process is executed, as shown in FIG. 4, the microcomputer 43 first judges in S10 whether or not the PID control circuit 51 is executing the feedback control of the pump current Ip. In the case where the PID control circuit 51 is not executing the feedback control, the microcomputer 43 waits by repeating the processing of S10 until the PID control circuit 51 starts the feedback control. In the case where the PID control circuit 51 is executing the feedback control, in S20, the microcomputer 43 starts a first timer provided in the RAM. The first timer is a timer which is incremented at intervals of, for example, 1 ms. When the first timer is started, its value is incremented from 0 (namely, 1 is added to the value (0)).

Next, in S30, the microcomputer 43 obtains the voltage of the terminal COM and the voltage of the terminal Vs+ from the sensor control circuit 41, and computes the voltage Vs by subtracting the voltage of the terminal COM from the voltage of the terminal Vs+. Subsequently, in S40, the microcomputer 43 judges whether or not the voltage Vs computed in S30 is equal to or higher than 250 mV and equal to or lower than 750 mV.

In the case where the voltage Vs is lower than 250 mV or higher than 750 mV, the microcomputer 43 judges in S50 whether or not a previously set deterioration determination time (5 seconds in the present embodiment) has elapsed. Specifically, the microcomputer 43 judges whether or not the value of the first timer is equal to or greater than a value corresponding to the deterioration determination time. In the case where the deterioration determination time has not yet elapsed, the microcomputer 43 proceeds to S30. Meanwhile, in the case where the deterioration determination time has elapsed, the microcomputer 43 ends the deterioration determination process.

Also, in the case where the microcomputer 43 determines in S40 that the voltage Vs is equal to or higher than 250 mV and equal to or lower than 750 mV, in S60, the microcomputer 43 judges whether or not the voltage Vs computed in S30 is equal to or higher than 400 mV and equal to or lower than 500 mV. In the case where the voltage Vs is lower than 400 mV or higher than 500 mV, the microcomputer 43 resets the counter provided in the RAM (namely, sets the value of the counter to 0) in S70 and proceeds to S30.

Meanwhile, in the case where the voltage Vs is equal to or higher than 400 mV and equal to or lower than 500 mV, in S80, the microcomputer 43 increments the counter. Then, the microcomputer 43 determines in S90 whether or not the value of the counter is equal to or greater than a previously set start determination value (3 in the present embodiment). In the case where the value of the counter is less than the start determination value, the microcomputer 43 proceeds to S30. Meanwhile, in the case where the value of the counter is equal to or greater than the start determination value, the microcomputer 43 starts the supply of the constant current −Iconst in S100. Specifically, the microcomputer 43 transmits to the control section 58 of the sensor control circuit 41 an energization start instruction for instructing the control section 58 to turn on the switches SW2 and turn off the switches SW1 and SW3.

Next, in S110, the microcomputer 43 starts a second timer provided in the RAM. The second timer is a timer which is incremented at intervals of, for example, 1 μs. When the second timer is started, its value is incremented from 0. Subsequently, the microcomputer 43 judges in S120 whether or not a previously set first detection time (60 μs in the present embodiment) has elapsed. Specifically, the microcomputer 43 judges whether or not the value of the timer is equal to or greater than a value corresponding to the first detection time.

In the case where the first detection time has not yet elapsed, the microcomputer 43 waits by repeating the processing of S120 until the first detection time elapses. When the first detection time elapses, in S130, the microcomputer 43 obtains, as a first difference voltage ΔVs1, the latest difference voltage ΔVs input to the microcomputer 43.

Further, the microcomputer 43 judges in S140 whether or not a previously set second detection time (5 ms in the present embodiment) has elapsed. Specifically, the microcomputer 43 judges whether or not the value of the timer is equal to or greater than a value corresponding to the second detection time.

In the case where the second detection time has not yet elapsed, the microcomputer 43 waits by repeating the processing of S140 until the second detection time elapses. When the second detection time elapses, in S150, the microcomputer 43 obtains, as a second difference voltage ΔVs2, the latest difference voltage ΔVs input to the microcomputer 43.

Figure 5:
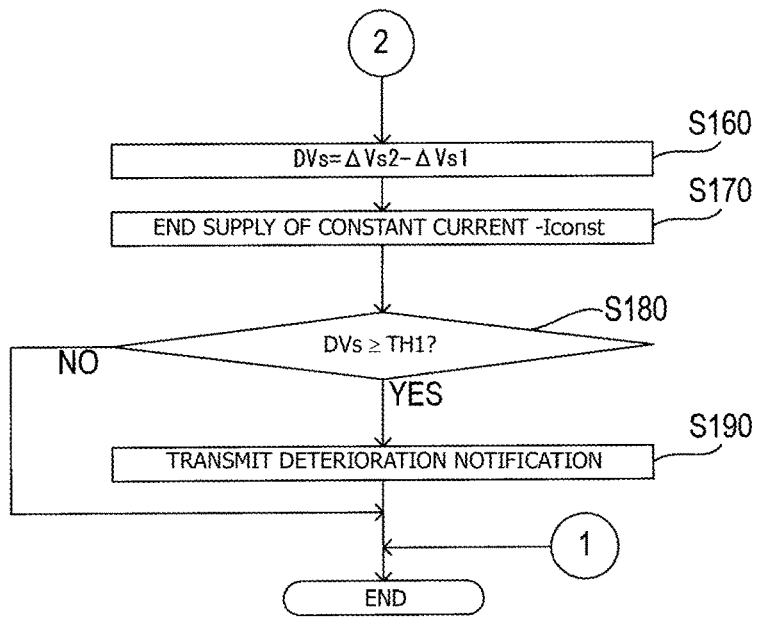
FIG. 5 is a flowchart showing a second portion of the deterioration determination process of the first embodiment.

Next, as shown in FIG. 5, in S160, the microcomputer 43 computers a first deterioration determination voltage DVs by subtracting the first difference voltage ΔVs1 from the second difference voltage ΔVs2. Subsequently, the microcomputer 43 ends the supply of the constant current −Iconst in S170. Specifically, the microcomputer 43 transmits to the control section 58 of the sensor control circuit 41 an energization stop instruction for instructing the control section 58 to turn off the switches SW1, SW2, and SW3.

Next, the microcomputer 43 judges in S180 whether or not the first deterioration determination voltage DVs is equal to or greater than a previously set first deterioration determination value TH1. In the case where the first deterioration determination voltage DVs is less than the first deterioration determination value TH1, the microcomputer 43 ends the deterioration determination process. Meanwhile, in the case where the first deterioration determination voltage DVs is equal to or greater than the first deterioration determination value TH1, in S190, the microcomputer 43 transmits to the engine ECU 9 a deterioration notification indicating that the oxygen concentration detection cell 13 has deteriorated, and ends the deterioration determination process.

Next, the steps of the concentration computation process executed by the microcomputer 43 will be described. The concentration computation process is a process which is repeatedly executed when the microcomputer 43 is operating.

Figure 6:
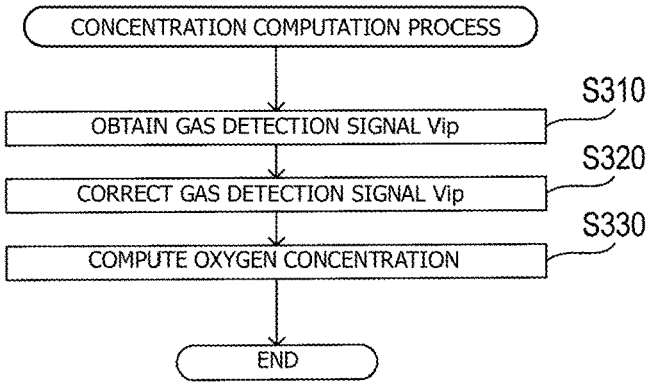
FIG. 6 is a flowchart showing a concentration computation process of the first embodiment.

When the concentration computation process is executed, as shown in FIG. 6, in S310, the microcomputer 43 first obtains the latest gas detection signal Vip input to the microcomputer 43. In S320, the microcomputer 43 corrects the gas detection signal Vip obtained in S310 by using the first deterioration determination voltage DVs computed in S160. Specifically, the microcomputer 43 corrects the gas detection signal Vip by referring to, for example, a detection signal correction map in which the correspondence between the value of the first deterioration determination voltage DVs and the value of the gas detection signal Vip after correction is set. However, in the case where the first deterioration determination voltage DVs has not yet been computed, the microcomputer 43 corrects the gas detection signal Vip by using an initial value previously set as the first deterioration determination voltage DVs.

In S330, as described above, the microcomputer 43 computes the oxygen concentration corresponding to the gas detection signal Vip corrected in S320, on the basis of the map or the calculation expression provided in the microcomputer 43, and ends the concentration computation process for the present.

Next, the steps of the target correction process executed by the microcomputer 43 will be described. The target correction process is executed immediately after electric power is supplied to the microcomputer 43 as a result of switching of the key switch of the vehicle from its OFF state to its ON state, whereby the microcomputer 43 starts.

Figure 7:
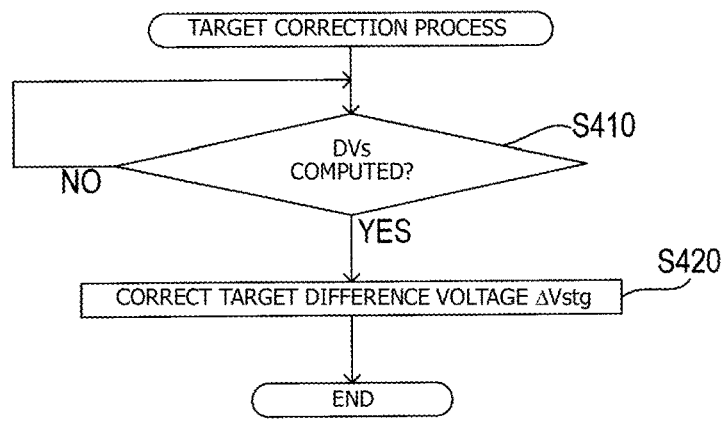
FIG. 7 is a flowchart showing a target correction process of the first embodiment.

When the target correction process is executed, as shown in FIG. 7, the microcomputer 43 first judges in S410 whether or not the first deterioration determination voltage DVs has been computed in S160. In the case where the first deterioration determination voltage DVs has not yet been computed, the microcomputer 43 waits by repeating the processing of S410 until the first deterioration determination voltage DVs is computed in S160. When the first deterioration determination voltage DVs is computed in S160, in S420, the microcomputer 43 corrects a target difference voltage $\Delta Vstg$, which is a target value used for the temperature control of the gas sensor 3, and ends the target correction process. Specifically, the microcomputer 43 corrects the target difference voltage $\Delta Vstg$ by referring to a target difference correction map in which the correspondence between the value of the first deterioration determination voltage DVs and the value of the target difference voltage $\Delta Vstg$ after correction is set.

Next, the steps of the heater control process executed by the microcomputer 43 will be described. The heater control process is a process which is repeatedly executed when the microcomputer 43 is operating.

Figure 8:
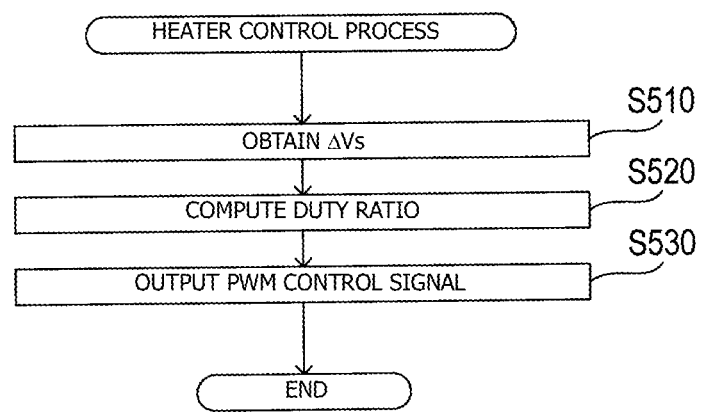
FIG. 8 is a flowchart showing a heater control process.

When the heater control process is executed, as shown in FIG. 8, in S510, the microcomputer 43 first obtains the latest difference voltage $\Delta Vs$ input to the microcomputer 43. Further, in S520, the microcomputer 43 computes the duty ratio of electric power supplied to the heater 30 on the basis of the difference voltage $\Delta Vs$ obtained in S510 such that the difference voltage $\Delta Vs$ becomes equal to the target difference voltage $\Delta Vstg$. Notably, the difference voltage $\Delta Vs$ obtained in this heater control process corresponds to the difference voltage $\Delta Vs$ obtained when the impedance Rpvs of the above-described oxygen concentration detection cell 13 is detected. Namely, the difference voltage $\Delta Vs$ differs from the above-described first and second difference voltages $\Delta Vs1$ and $\Delta Vs2$. In the present embodiment, the difference voltage $\Delta Vs$ obtained in this heater control process corresponds to the difference voltage $\Delta Vs$ which is obtained by supplying the constant current $-Iconst$ to the oxygen concentration detection cell 13 for 60 μs for detection of the impedance Rpvs of the oxygen concentration detection cell 13.

Subsequently, in S530, the microcomputer 43 outputs to the heater control circuit 42 a PWM control signal corresponding to the duty ratio computed in S520, and ends the heater control process.

The sensor control apparatus 1 configured as described above controls the gas sensor 3. The gas sensor 3 includes the measurement chamber 28 into which exhaust gas is introduced, the oxygen concentration detection cell 13, and the pump cell 11.

The oxygen concentration detection cell 13 includes the oxygen-ion-conductive solid electrolyte body 25 and the paired detection electrodes 26 and 27 formed on the oxygen-ion-conductive solid electrolyte body 25. The detection electrode 26 is disposed to face the measurement chamber 28, and the detection electrode 27 is disposed in the reference oxygen chamber 29 in which a reference oxygen partial pressure atmosphere is created, so that the voltage Vs corresponding to the oxygen partial pressure difference between the measurement chamber 28 and the reference oxygen chamber 29 is generated.

The pump cell 11 includes the oxygen-ion-conductive solid electrolyte body 21 and the paired pump electrodes 22 and 23 formed on the oxygen-ion-conductive solid electrolyte body 21. The pump electrode 23 is disposed to face the measurement chamber 28. In accordance with the pump current flowing between the paired pump electrodes 22 and 23, oxygen contained in the exhaust gas introduced into the measurement chamber 28 is pumped out or oxygen is pumped into the measurement chamber 28.

The sensor control apparatus 1 controls the pump current Ip such that the voltage Vs becomes equal to the control target voltage. The control target voltage is set to the stoichi-time voltage, which is the voltage Vs in the case where the oxygen concentration of the exhaust gas introduced into the measurement chamber 28 is equal to the oxygen concentration of the exhaust gas discharged from the engine 5 as a result of combustion in the engine 5 of an air-fuel mixture having a stoichiometric air-fuel ratio.

The sensor control apparatus 1 judges whether or not the voltage Vs falls within a first voltage range. The first voltage range is equal to or higher than 250 mV and equal to or lower than 750 mV. The judgment condition that the voltage Vs falls within the first voltage range is a condition for judging whether or not the PID control circuit 51 is controlling the pump current Ip. Also, the first voltage range is set to include the stoichi-time voltage.

In the case where the sensor control apparatus 1 judges that the voltage Vs falls within the first voltage range, the sensor control apparatus 1 judges whether or not the voltage Vs falls within a second voltage range. The second voltage range is equal to or higher than 400 mV and equal to or lower than 500 mV. The second voltage range is set to include the stoichi-time voltage and to be narrower than the first voltage range and be included in the first voltage range.

In the case where the sensor control apparatus 1 judges that the voltage Vs falls within the second voltage range, the sensor control apparatus 1 supplies the constant current −Iconst to the oxygen concentration detection cell 13.

At the point in time when the second detection time elapses after the supply of the constant current −Iconst has been started, the sensor control apparatus 1 detects the second difference voltage ΔVs2 which is generated in the oxygen concentration detection cell 13 as a result of the flow of the constant current −Iconst to the oxygen concentration detection cell 13.

As described above, the sensor control apparatus 1 detects the second difference voltage ΔVs2 at the point in time when the second detection time elapses after the supply of the constant current −Iconst to the oxygen concentration detection cell 13 has been started. Therefore, the sensor control apparatus 1 can obtain information necessary for judging whether or not the gas sensor 3 has deteriorated (namely, the second difference voltage ΔVs2) within a short period of time. Thus, the sensor control apparatus 1 can detect deterioration of the gas sensor 3 within a short period of time.

Further, after having judged that the voltage Vs falls within the first voltage range, the sensor control apparatus 1 judges whether or not the voltage Vs falls within the second voltage range. Therefore, the sensor control apparatus 1 can judged whether or not the gas sensor 3 has deteriorated while the PID control circuit 51 is controlling the pump current Ip.

Also, at the point in time when the first detection time elapses after the supply of the constant current −Iconst has been started, the sensor control apparatus 1 detects the first difference voltage ΔVs1 which is generated in the oxygen concentration detection cell 13 as a result of the flow of the constant current −Iconst to the oxygen concentration detection cell 13. The first detection time is previously set to be shorter than the second detection time.

The sensor control apparatus 1 computes the first deterioration determination voltage DVs by subtracting the first difference voltage ΔVs1 from the second difference voltage ΔVs2, and judges whether or not the gas sensor 3 has deteriorated on the basis of the first deterioration determination voltage DVs. As a result, the sensor control apparatus 1 can accurately detect the deterioration of the gas sensor 3. Also, since the sensor control apparatus 1 can employ, as the first deterioration determination voltage DVs, the difference between the second difference voltage ΔVs2 and the first difference voltage ΔVs1 which receive the influence of disturbance factors and fluctuate; i.e., voltage from which the disturbance factors have been removed, the deterioration detection accuracy can be improved. Notably, examples of the above-mentioned disturbance factors include variation of the oxygen concentration of the exhaust gas introduced into the measurement chamber 28, variation of the temperature of the exhaust gas, etc.

Also, in the case where the first deterioration determination voltage DVs is equal to or greater than the first deterioration determination value TH1, the sensor control apparatus 1 transmits to the engine ECU 9 a deterioration notification indicating that the oxygen concentration detection cell 13 has deteriorated. As a result, in the case where the gas sensor 3 has deteriorated, the sensor control apparatus 1 can prompt a user of the gas sensor 3 to take appropriate measures such as replacement of the gas sensor 3.

Also, the sensor control apparatus 1 corrects the gas detection signal Vip on the basis of the first deterioration determination voltage DVs. As result, the sensor control apparatus 1 can prevent a decrease in oxygen concentration detection accuracy even when the impedance Rpvs changes due to deterioration of the gas sensor 3.

Also, the sensor control apparatus 1 supplies the constant current −Iconst to the oxygen concentration detection cell 13. At the point when the previously set first pulse-on time elapses after the supply of the constant current −Iconst has been started, the sensor control apparatus 1 detects the difference voltage ΔVs which is generated in the oxygen concentration detection cell 13 as a result of the flow of the constant current −Iconst to the oxygen concentration detection cell 13.

Also, the sensor control apparatus 1 controls the energization of the heater 30, which heats the oxygen concentration detection cell 13 and the pump cell 11, through use of the difference voltage ΔVs. The sensor control apparatus 1 corrects the energization control of the heater 30 by correcting the target difference voltage ΔVstg on the basis of the first deterioration determination voltage DVs.

As a result, the sensor control apparatus 1 can prevent a decrease in the accuracy of the temperature control of the gas sensor 3 by the heater 30 even when the difference voltage ΔVs changes due to the deterioration of the gas sensor 3.

In the embodiment described above, the exhaust gas corresponds to the gas under measurement, the oxygen-ion-conductive solid electrolyte body 25 corresponds to the first solid electrolyte body, the detection electrodes 26 and 27 correspond to the pair of first electrodes, and the voltage Vs corresponds to the electromotive force cell voltage.

Also, the oxygen-ion-conductive solid electrolyte body 21 corresponds to the second solid electrolyte body, and the pump electrodes 22 and 23 correspond to the processing as the pair of second electrodes.

Also, the PID control circuit 51 corresponds to the current control section, S40 corresponds to the processing as the first condition judgment section, S60 corresponds to the processing as the second condition judgment section, S100 corresponds to the processing as the deterioration detection energization section, and S140 and S150 correspond to the processing as the deterioration voltage detection section.

Also, the constant current −Iconst corresponds to the deterioration detection current, the second detection time corresponds to the deterioration detection time, and the second difference voltage ΔVs2 corresponds to the deterioration detection voltage.

Also, S180 corresponds to the processing as the deterioration judgment section, the first deterioration determination voltage DVs corresponds to the deterioration determination voltage, S120 and S130 correspond to the processing as the preliminary deterioration voltage detection section, the first detection time corresponds to the preliminary deterioration detection time, and the first difference voltage ΔVs1 corresponds to the preliminary deterioration detection voltage.

Also, S190 corresponds to the processing as the notification section, and S320 corresponds to the processing as the pump current correction section.

Also, the switches SW2, the current sources 54 and 56, and the control section 58 correspond to the impedance detection energization section, the operational amplifier OP3 corresponds to the impedance voltage detection section, S510 to S530 correspond to the processing as the heater control section, and S410 and S420 correspond to the processing as the control correction section.

Also, the constant current −Iconst corresponds to the impedance detection current as well, the first pulse-on time corresponds to the impedance detection time, the difference voltage ΔVs corresponds to the impedance detection voltage, and the target difference voltage ΔVstg corresponds to the target value of the controlled variable for controlling the heater.

Second Embodiment

A second embodiment of the present disclosure will now be described with reference to the drawings. Notably, in the second embodiment, portions different from those of the first embodiment will be described. Common constituent elements are denoted by the same reference numerals.

A sensor control apparatus 1 of the second embodiment differs from that of the first embodiment in the point that the deterioration determination process, the concentration computation process, and the target correction process are changed.

First, the deterioration determination process of the second embodiment differs from that of the first embodiment in the point that the processes of S120, S130, and S160 are omitted, and the process of S182 is executed in place of S180.

Figure 9:
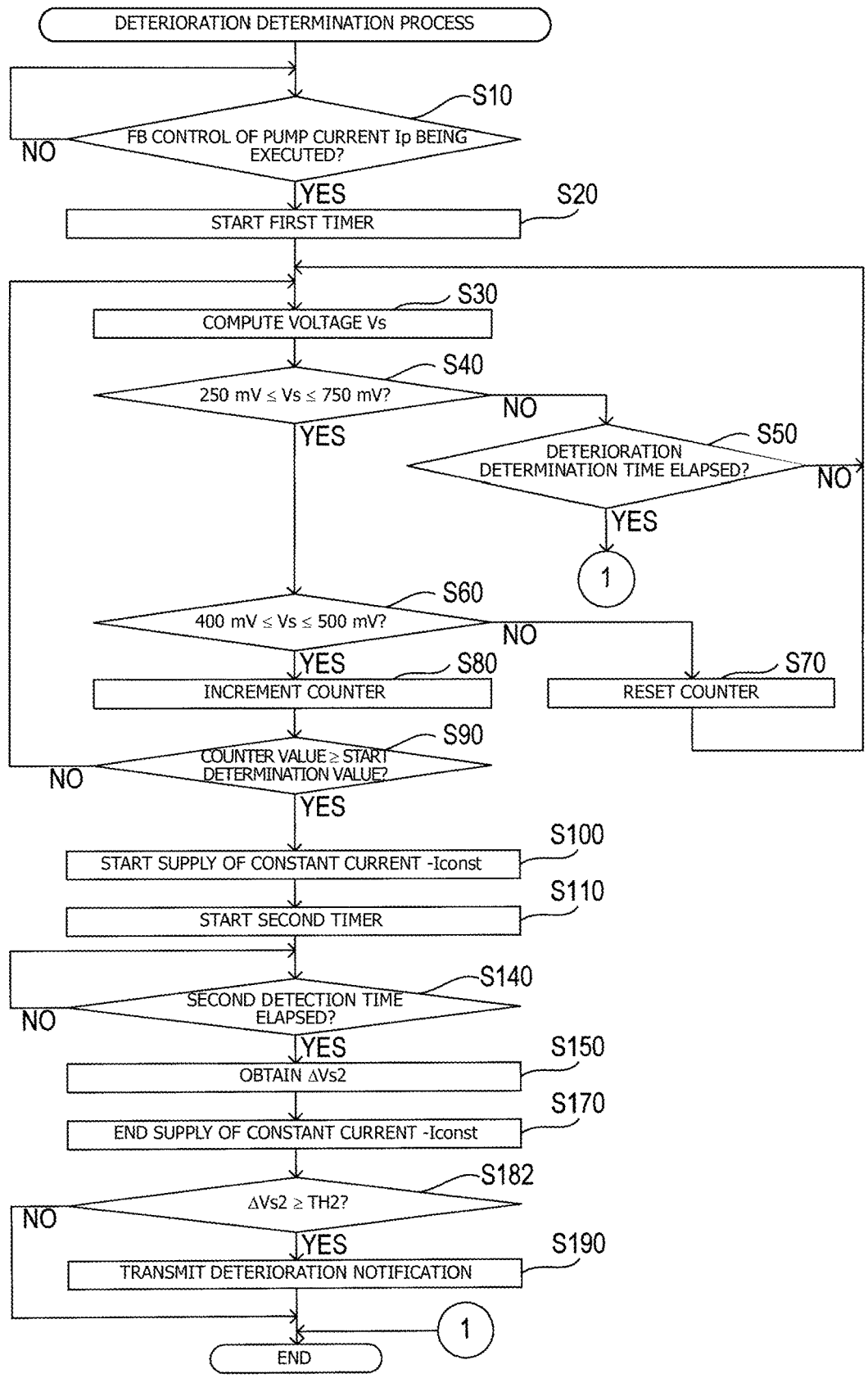
FIG. 9 is a flowchart showing a deterioration determination process of a second embodiment.

Namely, as shown in FIG. 9, after ending the process of S110, the microcomputer 43 executes the process of S140. Also, after ending the process of S150, the microcomputer 43 executes the process of S170. Also, after ending the process of S170, in S182, the microcomputer 43 determines whether or not the second difference voltage ΔVs2 is equal to or greater than a previously set second deterioration determination value TH2. In the case where the second difference voltage ΔVs2 is less than the second deterioration determination value TH2, the microcomputer 43 ends the deterioration determination process. Meanwhile, in the case where the second difference voltage ΔVs2 is equal to or greater than the second deterioration determination value TH2, the microcomputer 43 proceeds to S190.

Next, the concentration computation process of the second embodiment differs from that of the first embodiment in the point that the process of S322 is executed in place of S320.

Figure 10:
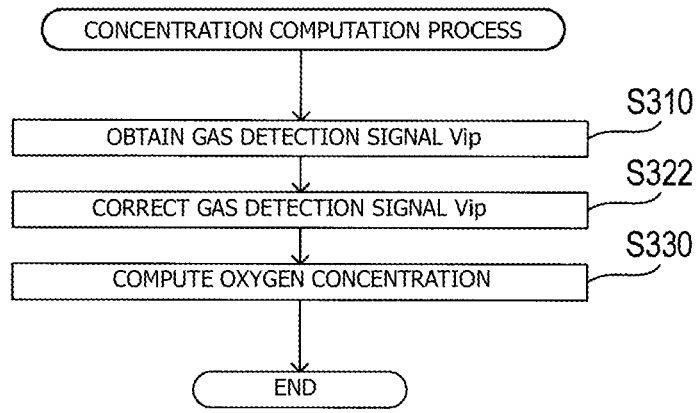
FIG. 10 is a flowchart showing a concentration computation process of the second embodiment.

Namely, as shown in FIG. 10, after ending the process of S310, in S322, the microcomputer 43 corrects the gas detection signal Vip obtained in S310 by using the second difference voltage ΔVs2 obtained in S150. Specifically, the microcomputer 43 corrects the gas detection signal Vip by referring to, for example, a detection signal correction map in which the correspondence between the value of the second difference voltage ΔVs2 and the value of the gas detection signal Vip after correction is set. However, in the case where the second difference voltage ΔVs2 has not yet been obtained, the microcomputer 43 corrects the gas detection signal Vip by using an initial value previously set as the second difference voltage ΔVs2. Subsequently, after ending the process of S322, the microcomputer 43 proceeds to S330.

Next, the target correction process of the second embodiment differs from that of the first embodiment in the point that the processes of S412 and S422 are executed in place of S410 and S420.

Figure 11:
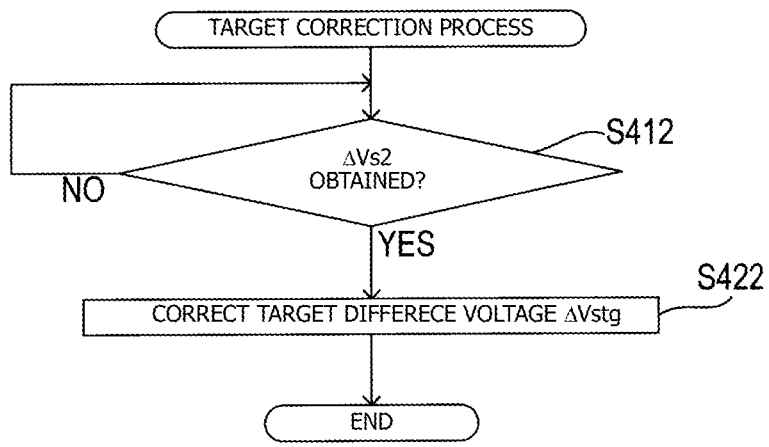
FIG. 11 is a flowchart showing a target correction process of the second embodiment.

Namely, as shown in FIG. 11, when the target correction process of the second embodiment is executed, the microcomputer 43 first judges in S412 whether or not the second difference voltage ΔVs2 has been obtained in S150. In the case where the second difference voltage ΔVs2 has not yet been obtained, the microcomputer 43 waits by repeating the processing of S412 until the second difference voltage ΔVs2 is obtained in S150. When the second difference voltage ΔVs2 is obtained in S150, in S422, the microcomputer 43 corrects the target difference voltage ΔVstg, which is a target value used for the temperature control of the gas sensor 3, and ends the target correction process. Specifically, the microcomputer 43 corrects the target difference voltage ΔVstg by referring to a target difference correction map in which the correspondence between the value of the second difference voltage ΔVs2 and the value of the target difference voltage ΔVstg after correction is set.

The sensor control apparatus 1 configured as described above judges whether or not the gas sensor has deteriorated on the basis of the second difference voltage ΔVs2. Therefore, as the voltage for deterioration determination, the sensor control apparatus 1 can employ the detected second difference voltage ΔVs2 as is, whereby the processing load for deterioration detection can be reduced.

In the embodiment described above, S182 corresponds to the processing as the deterioration judgment section, the second difference voltage ΔVs2 corresponds to the deterioration determination voltage, and S322 corresponds to the processing as the pump current correction section. S412 and S422 correspond to the processing as the control correction section.

Third Embodiment

A third embodiment of the present disclosure will now be described with reference to the drawings. Notably, in the third embodiment, portions different from those of the first embodiment will be described. Common constituent elements are denoted by the same reference numerals.

A sensor control apparatus 1 of the third embodiment differs from that of the first embodiment in the point that the deterioration determination process, the concentration computation process, and the target correction process are changed.

First, the deterioration determination process of the third embodiment differs from that of the first embodiment in the point that the processes of S120, S130, and S160 are omitted, the process of S174 is added, and the process of S184 is executed in place of S180.

Figure 12:
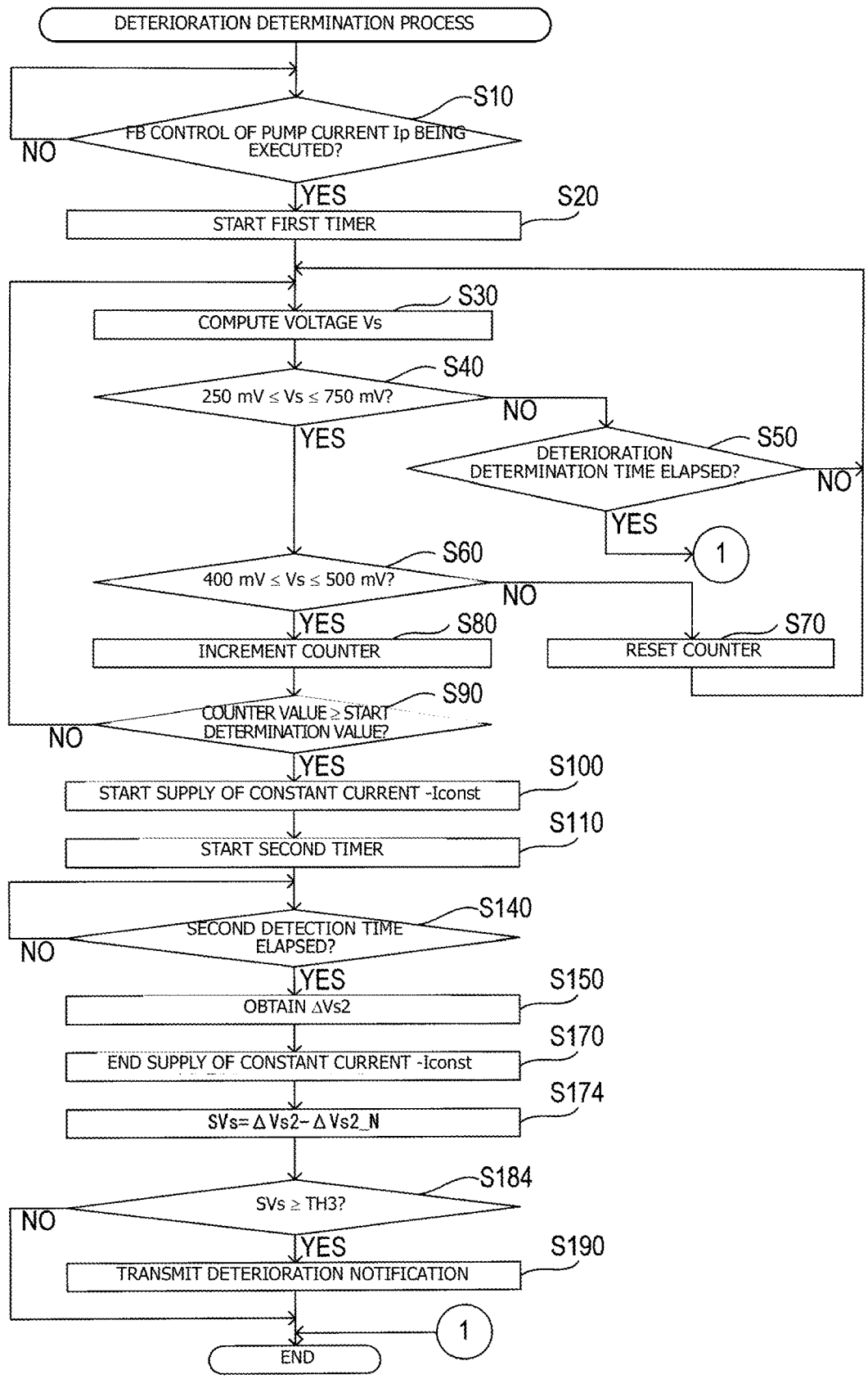
FIG. 12 is a flowchart showing a deterioration determination process of a third embodiment.

Namely, as shown in FIG. 12, after ending the process of S110, the microcomputer 43 executes the process of S140. Also, after ending the process of S150, the microcomputer 43 executes the process of S170. Also, after ending the process of S170, in S174, the microcomputer 43 computes a second deterioration determination voltage SVs by subtracting a new-sensor second difference voltage ΔVs2_N from the second difference voltage ΔVs2 obtained in S150. The new-sensor second difference voltage ΔVs2_N is obtained by previously measuring the second difference voltage ΔVs2 for a new gas sensor 3.

After ending the process of S174, the microcomputer 43 judges in S184 whether or not the second deterioration determination voltage SVs is equal to or greater than a previously set third deterioration determination value TH3. In the case where the second deterioration determination voltage SVs is less than the third deterioration determination value TH3, the microcomputer 43 ends the deterioration determination process. Meanwhile, in the case where the second deterioration determination voltage SVs is equal to or greater than the third deterioration determination value TH3, the microcomputer 43 proceeds to S190.

Next, the concentration computation process of the third embodiment differs from that of the first embodiment in the point that the process of S324 is executed in place of S320.

Figure 13:
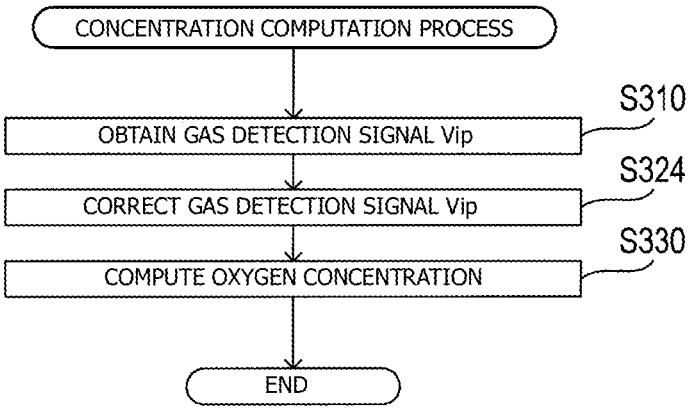
FIG. 13 is a flowchart showing a concentration computation process of the third embodiment.

Namely, as shown in FIG. 13, after ending the process of S310, in S324, the microcomputer 43 corrects the gas detection signal Vip obtained in S310 by using the second deterioration determination voltage SVs obtained in S174. Specifically, the microcomputer 43 corrects the gas detection signal Vip by referring to, for example, a detection signal correction map in which the correspondence between the value of the second deterioration determination voltage SVs and the value of the gas detection signal Vip after correction is set. However, in the case where the second deterioration determination voltage SVs has not yet been computed, the microcomputer 43 corrects the gas detection signal Vip by using an initial value previously set as the second deterioration determination voltage SVs. Subsequently, after ending the process of S324, the microcomputer 43 proceeds to S330.

Next, the target correction process of the third embodiment differs from that of the first embodiment in the point that the processes of S414 and S424 are executed in place of S410 and S420.

Figure 14:
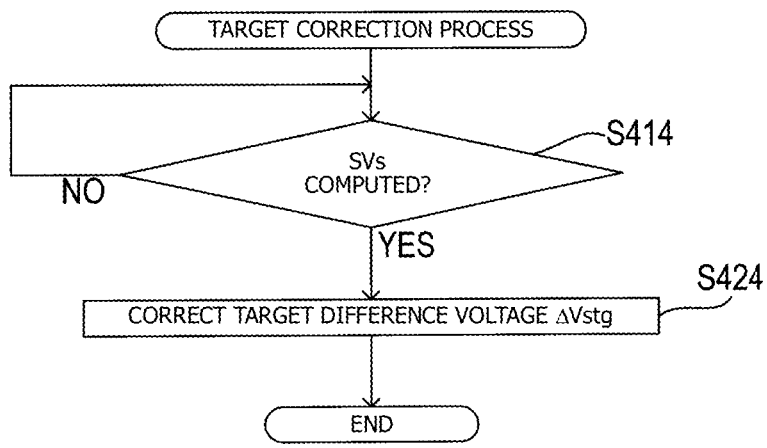
FIG. 14 is a flowchart showing a target correction process of the third embodiment.

Namely, as shown in FIG. 14, when the target correction process of the third embodiment is executed, the microcomputer 43 first judges in S414 whether or not the second deterioration determination voltage SVs has been computed in S174. In the case where the second deterioration determination voltage SVs has not yet been computed, the microcomputer 43 waits by repeating the processing of S414 until the second deterioration determination voltage SVs is computed in S174. When the second deterioration determination voltage SVs is computed in S174, in S424, the microcomputer 43 corrects the target difference voltage ΔVstg, which is a target value used for the temperature control of the gas sensor 3, and ends the target correction process. Specifically, the microcomputer 43 corrects the target difference voltage ΔVstg by referring to a target difference correction map in which the correspondence between the value of the second deterioration determination voltage SVs and the value of the target difference voltage ΔVstg after correction is set.

The sensor control apparatus 1 configured as described above judges whether or not the gas sensor has deteriorated on the basis of the second deterioration determination voltage SVs obtained by subtracting, from the second difference voltage ΔVs2, the new-sensor second difference voltage ΔVs2_N, which is previously set as the the second difference voltage ΔVs2 at the time when the gas sensor 3 is new. Therefore, as the voltage for deterioration determination, the sensor control apparatus 1 can employ an increase in the second difference voltage ΔVs2 due to deterioration, whereby the deterioration detection accuracy can be improved, and the degree of deterioration can be judged.

In the embodiment described above, S184 corresponds to the processing as the deterioration judgment section, the new-sensor second difference voltage ΔVs2_N corresponds to the new-sensor deterioration detection voltage, and the second deterioration determination voltage SVs corresponds to the deterioration determination voltage.

Also, S324 corresponds to the processing as the pump current correction section. S414 and S424 correspond to the processing as the control correction section.

One embodiment of the present disclosure has been described above, but the present disclosure is not limited to the above embodiment and can be embodied in various other forms.

For example, in the above-described embodiments, the gas sensor is an oxygen sensor. However, the gas sensor may be a gas sensor which detects a gas (for example, NOx or the like) other than oxygen.

Also, the function of one constituent element in the above embodiments may be distributed to a plurality of constituent elements, or the functions of a plurality of constituent elements may be realized by one constituent element. Part of the configurations of the above embodiments may be omitted. Also, at least part of the configuration of each of the above embodiments may be added to or partially replace the configurations of other embodiments. Notably, all modes included in the technical idea specified by the wording of the claims are embodiments of the present disclosure.

The present disclosure may be realized in various forms other than the above-described sensor control apparatus 1. For example, the present disclosure may be realized as a system including the sensor control apparatus 1 as a constituent element, a program for causing a computer to function as the sensor control apparatus 1, a medium on which the program is recorded, and a sensor control method.

DESCRIPTION OF REFERENCE NUMERALS

1 . . . sensor control apparatus; 3 . . . gas sensor; 11 . . . pump cell; 13 . . . oxygen concentration detection cell; 21 . . . oxygen-ion-conductive solid electrolyte body; 22, 23 . . . pump electrode; 25 . . . oxygen-ion-conductive solid electrolyte body; 26, 27 . . . detection electrode; 28 . . . measurement chamber; 29 . . . reference oxygen chamber; 51 . . . PID control circuit

The invention claimed is:

1. A sensor control apparatus for controlling a gas sensor which includes a measurement chamber into which a target gas is introduced, an oxygen concentration detection cell, and a pump cell, the oxygen concentration detection cell having a first solid electrolyte body and paired first electrodes which are formed on the first solid electrolyte body, one of which is disposed to face the measurement chamber, and the other of which is disposed in a reference oxygen chamber set to a reference oxygen partial pressure atmosphere, and being configured to generate an electromotive force cell voltage corresponding to an oxygen partial pressure difference between the measurement chamber and the reference oxygen chamber, and the pump cell having a second solid electrolyte body and paired second electrodes which are formed on the second solid electrolyte body and one of which is disposed to face the measurement chamber, and being configured to pump out oxygen contained in the target gas introduced into the measurement chamber or pump oxygen into the measurement chamber in accordance with pump current flowing between the second electrodes, the sensor control apparatus comprising:

a sensor control circuit; and a microcomputer, wherein the sensor control circuit is configured to control the pump current such that the electromotive force cell voltage becomes equal to a previously set control target voltage;

the microcomputer is configured to judge whether or not a first deterioration detection condition is satisfied, said first detection condition being previously set and indicating that the sensor control circuit is controlling the pump current;

the microcomputer is configured to judge, when the microcomputer judges that the first deterioration detection condition is satisfied, whether or not a previously set second deterioration detection condition is satisfied when the microcomputer judges that the first deterioration detection condition is satisfied;

the microcomputer is configured to supply deterioration detection current having a predetermined constant current value to the oxygen concentration detection cell when the microcomputer judges that the second deterioration detection condition is satisfied; and the microcomputer is configured to detect deterioration detection voltage after a predetermined deterioration detection time following the supply of the deterioration detection current to the oxygen concentration detection cell, the deterioration detection voltage being generated in the oxygen concentration detection cell as a result of the deterioration detection current flowing to the oxygen concentration detection cell, the control target voltage is set to a stoichi-time voltage which is the electromotive force cell voltage in a case where the oxygen concentration of the target gas is equal to the oxygen concentration of gas discharged from an internal combustion engine as a result of combustion in the internal combustion engine of an air-fuel mixture having a stoichiometric air-fuel ratio, the first deterioration detection condition occurs when the electromotive force cell voltage falls within a first voltage range set to include the stoichi-time voltage, and the second deterioration detection condition occurs when the electromotive force cell voltage falls within a second voltage range that is set to include the stoichi-time voltage, is narrower than the first voltage range, and is included within the first voltage range.

2. The sensor control apparatus according to claim 1, wherein the microcomputer is configured to judge whether or not the gas sensor has deteriorated based on a deterioration determination voltage set from the deterioration detection voltage.

3. The sensor control apparatus according to claim 2, wherein the microcomputer is configured to detect a preliminary deterioration detection voltage after a preliminary deterioration detection time following the supply of the deterioration detection current to the oxygen concentration detection cell, the preliminary deterioration detection voltage being previously set to be shorter than the deterioration detection time and being generated in the oxygen concentration detection cell as a result of the deterioration detection current flowing to the oxygen concentration detection cell, wherein the deterioration determination voltage is obtained by subtracting the preliminary deterioration detection voltage from the deterioration detection voltage.

4. The sensor control apparatus according to claim 2, wherein the deterioration determination voltage is the deterioration detection voltage.

5. The sensor control apparatus according to claim 2, wherein the deterioration determination voltage is obtained by subtracting a new-sensor deterioration detection voltage from the deterioration detection voltage, said new-sensor deterioration detection voltage being previously set as the deterioration detection voltage when the gas sensor is new.

6. The sensor control apparatus according to claim 2, wherein the microcomputer is configured to notify a deterioration of the gas sensor when the gas sensor is judged as being deteriorated.

7. The sensor control apparatus according to claim 1, wherein the microcomputer is configured to correct the current value of the pump current on the basis of the deterioration determination voltage set through use of the deterioration detection voltage.

8. The sensor control apparatus according to claim 1, wherein, the microcomputer is configured to supply impedance detection current having a predetermined constant current value to the oxygen concentration detection cell, the microcomputer is configured to detect an impedance detection voltage after a predetermined impedance detection time following the supply of the impedance detection current to the oxygen concentration detection cell, the impedance detection voltage being generated in the oxygen concentration detection cell as a result of the impedance detection current flowing to the oxygen concentration detection cell, the microcomputer is configured to control energization of a heater for heating the oxygen concentration detection cell and the pump cell through use of the impedance detection voltage, and the microcomputer is configured to correct the control of energization of the heater on the basis of the deterioration determination voltage set from the deterioration detection voltage.

9. The sensor control apparatus according to claim 8, wherein the microcomputer is configured to correct the control of energization of the heater by correcting a target value of a controlled variable for controlling the heater on the basis of the deterioration determination voltage.

\* \* \* \* \*